US007861843B2

(12) United States Patent
Aulanko et al.

(10) Patent No.: US 7,861,843 B2
(45) Date of Patent: Jan. 4, 2011

(54) TRAVELATOR AND METHOD FOR CONTROLLING THE OPERATION OF A TRAVELATOR

(75) Inventors: Esko Aulanko, Kerava (FI); Jorma Mustalahti, Hyvinkaa (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/073,706

(22) Filed: Mar. 7, 2008

(65) Prior Publication Data

US 2008/0185263 A1 Aug. 7, 2008

Related U.S. Application Data

(63) Continuation of application No. PCT/FI2006/000283, filed on Aug. 25, 2006.

(30) Foreign Application Priority Data

Sep. 9, 2005 (FI) ................................. 20050903

(51) Int. Cl.

*B65G 15/00* (2006.01)
*B65G 23/24* (2006.01)
*B65G 23/16* (2006.01)
*B65G 43/00* (2006.01)

(52) U.S. Cl. ....................... 198/322; 198/321; 198/323; 198/329; 198/810.04

(58) Field of Classification Search ................. 198/321, 198/322, 323, 329, 810.04
See application file for complete search history.

(56) References Cited

U.S. PATENT DOCUMENTS 3,896,925 A * 7/1975 Mitsui et al. ................ 198/323
3,913,723 A * 10/1975 Johnson ...................... 198/323
4,284,192 A * 8/1981 Taylor ........................ 198/813
4,397,096 A * 8/1983 Kraft et al. .................... 33/655

(Continued)

FOREIGN PATENT DOCUMENTS

EP 0 497 447 A1 8/1992

(Continued)

*Primary Examiner*—Gene Crawford
*Assistant Examiner*—Yolanda Cumbess
(74) *Attorney, Agent, or Firm*—Birch, Stewart, Kolasch & Birch, LLP

(57) ABSTRACT

Travelator, the conveyor of which comprises a frame, which comprises a stationary first frame part and a second frame part that moves in relation to it. The drive wheel is mounted on a bearing allowing rotation onto the first frame part. The power unit rotates the drive wheel. The diverting wheel is mounted on a bearing allowing free rotation onto the second frame part. The transport surfaces are connected to a traction element which is formed as an endless loop, and which is led to pass over the drive wheel and the diverting wheel. The tightening device is arranged to act between the first frame part and the second frame part to move the diverting wheel linearly away from the drive wheel in order to exert tightening force on the traction element. The travelator comprises identification means for identifying the drive status of the conveyor, and adjustment means for adjusting the tightening force of the tightening device to different force levels based on the drive status identified. In the method the drive status of the conveyor is identified, and the tightening force of the endless traction element of the conveyor of the travelator is adjusted on the basis of the drive status identified.

17 Claims, 3 Drawing Sheets

U.S. PATENT DOCUMENTS

| | | | | |
|---|---|---|---|---|
| 5,307,920 | A * | 5/1994 | Meyer et al. | 198/335 |
| 5,641,058 | A | 6/1997 | Merten et al. | |
| 6,092,639 | A * | 7/2000 | Reo | 198/329 |
| 6,695,130 | B1 * | 2/2004 | Blaylock et al. | 198/813 |
| 6,708,817 | B2 * | 3/2004 | Klabisch et al. | 198/813 |

FOREIGN PATENT DOCUMENTS

| | | | |
|---|---|---|---|
| JP | 4-89791 | A | 3/1992 |
| JP | 10-87252 | A | 4/1998 |
| JP | 2003-054864 | A | 2/2003 |
| JP | 2003-118964 | A | 4/2003 |

* cited by examiner

TRAVELATOR AND METHOD FOR CONTROLLING THE OPERATION OF A TRAVELATOR

This application is a Continuation of copending PCT International Application No. PCT/FI2006/00283 filed on Aug. 25, 2006, which designated the United States, and on which priority is claimed under 35 U.S.C. §120. This application also claims priority under 35 U.S.C. §119(a) on Patent Application No(s). 20050903 filed in Finland on Sep. 9, 2005. The entire contents of each of the above documents is hereby incorporated by reference.

FIELD OF THE INVENTION

The present invention relates to a travelator as defined in the preamble of claim 1. In addition, the present invention relates to a method as defined in the preamble of claim 13.

BACKGROUND OF THE INVENTION

Figure 1:
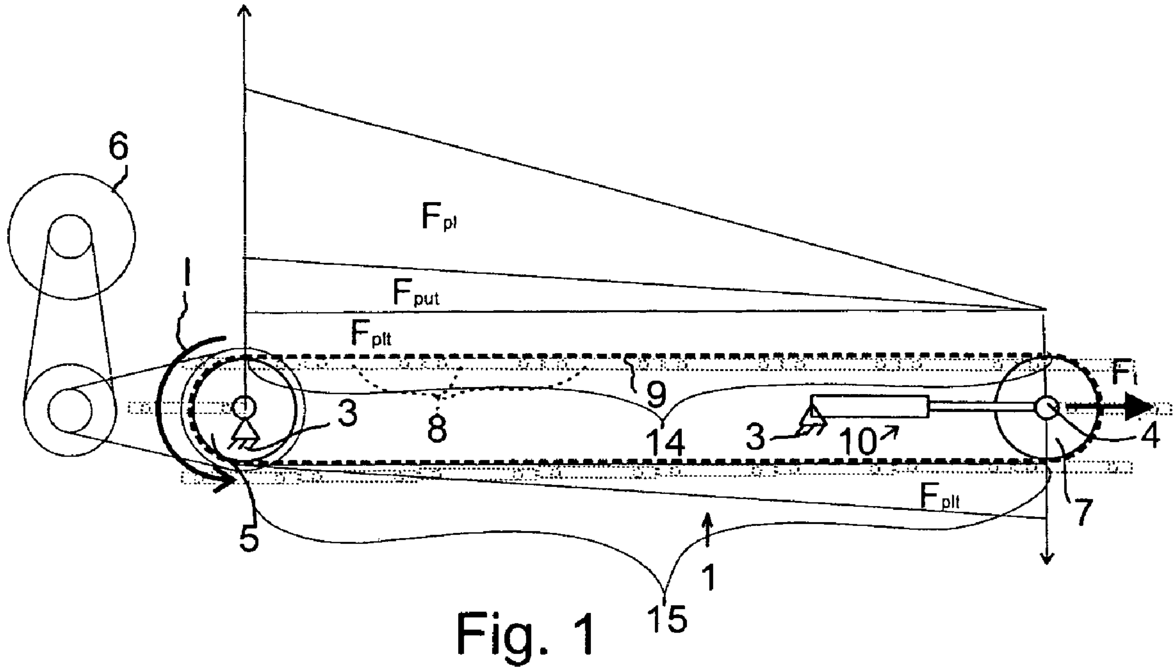
Figure 2:
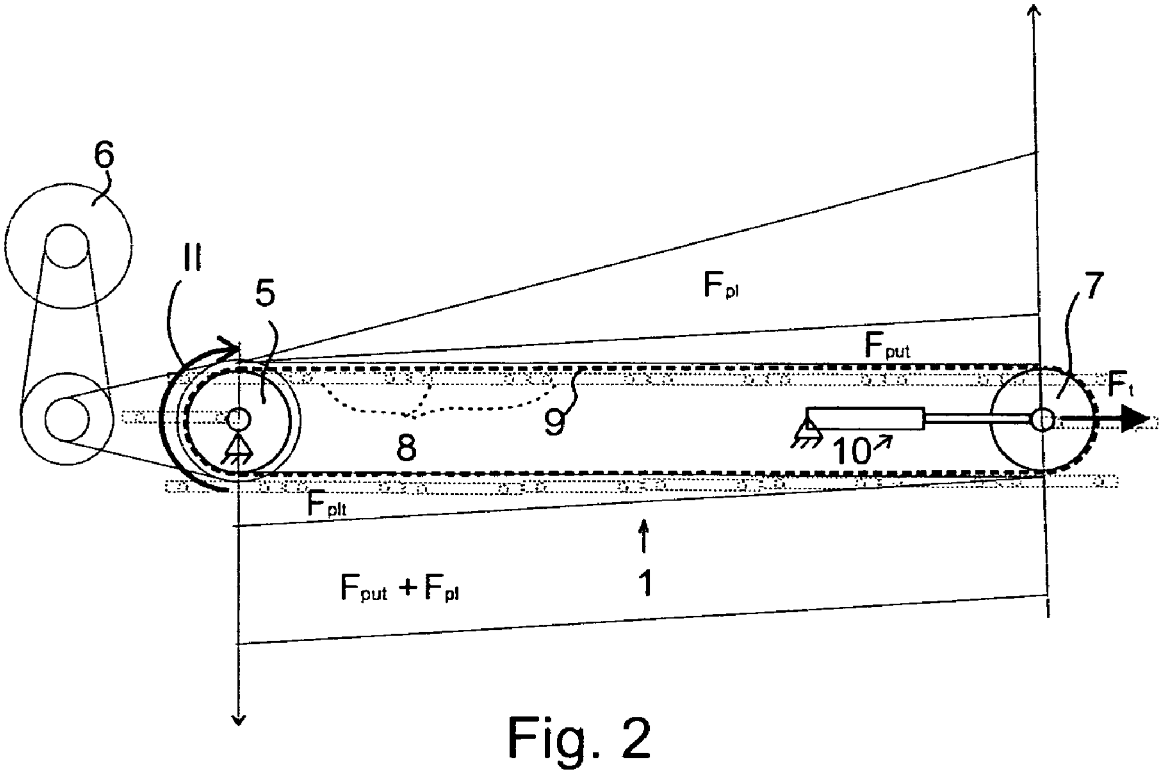

A prior-art travelator diagrammatically presented in FIGS. 1 and 2. This type of travelator comprises a conveyor, which conveys passengers from one end of the travelator to the other. The conveyor comprises a frame. The frame is divided into two parts. The first frame part 3 is essentially fixed in its position, and the second frame part 4 is controlled to move in relation to the first frame part. A drive wheel 5 is mounted onto the first frame part 3 on a bearing allowing rotation, and a power unit 6 is arranged to rotate said drive wheel. A diverting wheel 7 is mounted onto the second frame part 4 on a bearing allowing free rotation. A traction element 9 formed as an endless loop, to which the transport surfaces 8 are connected, moves the transport surfaces 8 along an endless ring-like and flat-shaped path of travel with traction element 9 being led to pass over the drive wheel 5 and the diverting wheel 7. To achieve suitable tightening force and pre-tensioning a tightening device 10 is arranged for the traction element 9, which acts between the first frame part 3 and the second frame part 4 such that it tries to move the diverting wheel 7 linearly away from the drive wheel 5. The traction element 9 comprises an upper section 14, in which the transport surfaces 8 connected to the traction element travel from the first end to the second end of the conveyor 1 in order to convey passengers, and a lower section 15, in which the transport surfaces return from the second end back to the first end.

Tightening is required so that the traction element does not slip off the drive wheel if force is transmitted between the traction element and the drive wheel by means of friction, when the traction element is e.g. a belt and the drive wheel is a belt pulley. Similarly if force is transmitted between the traction element and the drive wheel by shaped transmission, such as when the traction element is a sprocket chain and the drive wheel and diverting wheel are sprocket wheels, the purpose of tightening is to prevent the sprocket chain from jumping off the sprocket wheel.

The conveyor 1 can be driven in the forward drive direction I as shown in FIG. 1, in which the travel direction of the upper section 14 of the traction element is from the diverting wheel 7 towards the drive wheel 5, and in the reverse drive direction II of FIG. 2, in which the travel direction of the upper section 14 is from the drive wheel 5 to the diverting wheel 7.

Although the conveyor would preferably be driven mainly in the forward drive direction of FIG. 1, there may sometimes be a need to drive it in the reverse drive direction according to FIG. 2.

One problem is the minimum tightening force needed by the traction element, which is substantially greater in the reverse drive direction than in the forward drive direction. Furthermore the load exerted on the conveyor affects the tightening force needed.

FIG. 1 presents the force situation in the forward drive direction. In the forward drive direction the minimum tightening force is $$Ftmin=2\times Fplt+Fput+Fpl$$

where

Ftmin=minimum tightening force

Fplt=friction caused by the lower section of the conveyor

Fput=friction caused by the upper section of the conveyor

Fpl=friction caused by the load conveyed by the conveyor

In the reverse drive direction of FIG. 2 the minimum tightening force is $$Ftmin=2\times Fput+2\times Fpl+Fplt$$

where

Ftmin=minimum tightening force

Fplt=friction caused by the lower section of the conveyor

Fput=friction caused by the upper section of the conveyor

Fpl=friction caused by the load conveyed by the conveyor

In the reverse drive direction the tightening of the traction element must overcome the friction force of the whole conveyor and load. Therefore the traction element must be pre-tensioned to a much greater force compared to the forward drive direction.

If the travelator is equipped with a tightening device, which provides a constant force, such as a spring or similar, it would have to be dimensioned to provide the greater tightening force that the reverse drive direction requires.

One problem with this is that the traction element and the drive wheel and the diverting wheel then wear quickly, in which case their service life and servicing interval become short.

PURPOSE OF THE INVENTION

The purpose of the invention is to eliminate the aforementioned drawbacks.

In particular the purpose of the invention is to present a travelator and method, as a result of which the service life of the traction element can be lengthened.

SUMMARY OF THE INVENTION

The travelator according to the invention is characterized by what is disclosed in claim 1. In addition the method according to the invention is characterized by what is disclosed in claim 13.

The travelator according to the invention comprises identification means for identifying the drive status of the conveyor, and adjustment means for adjusting the tightening force of the tightening device to different force levels on the basis of the drive status identified.

In the method according to the invention the drive status of the conveyor is identified, and the tightening force of the endless traction element of the conveyor of the travelator is adjusted based on the drive status identified.

One advantage of the invention is that it presents an easy way for automatic adjustment of the tightening force of the traction element according to a predicted, i.e. known before the starting of the travelator, or drive-time drive status such that the traction element is not continuously subjected to a large tightening force, but only according to need, in which case the service life of the traction element becomes maximally long.

A further advantage is that damage of the equipment due to tightening force that is too small is effectively prevented.

In one embodiment of the travelator the identification means are arranged to identify a change in the drive status during the operation of the conveyor, and the adjustment means are arranged to adjust the tightening force of the tightening device to different force levels based on the identified change in the drive status.

In one embodiment of the travelator the drive direction of the conveyor can be changed. The identification means are arranged to identify the drive status, which is the setting of the forthcoming drive direction before the starting of the conveyor in the drive direction defined by the setting.

In one embodiment of the travelator the identification means are arranged to identify the drive status, which is the load exerted on the conveyor.

In one embodiment of the travelator the identification means are arranged to identify a change in the load exerted on the conveyor.

In one embodiment of the travelator the power unit is a motor. The identification means comprise means for determining the torque of the motor in order to identify the load.

In one embodiment of the travelator the identification means comprise means for determining the stresses of the frame of the conveyor in order to identify the load.

In one embodiment of the travelator the tightening device comprises at least one hydraulic cylinder, which is connected at one end to the first frame part and at the other end to the second frame part. The adjustment means comprise a control device, which is fitted to control the hydraulic pressure of the hydraulic cylinder in order to select different levels of tightening force.

In one embodiment of the travelator the tightening force of the tightening device can be adjusted to at least two different force levels.

In one embodiment of the travelator the tightening force of the tightening device can be adjusted steplessly to different force levels.

In one embodiment of the travelator the traction element comprises an upper section, in which the transport surfaces connected to the traction element travel from the first end to the second end of the conveyor in order to convey passengers and a lower section, in which the transport surfaces return from the second end back to the first end. The conveyor can be driven in the forward drive direction, in which the travel direction of the upper section is from the diverting wheel towards the drive wheel, and in the reverse drive direction, in which the travel direction of the upper section is from the drive wheel to the diverting wheel. In the reverse drive direction the tightening force of the tightening device is adjusted to a force level, which is essentially greater than in the forward drive direction.

In one embodiment of the travelator the conveyor includes a control device, which comprises a direction switch or similar, which has a first setting, which corresponds to the forward drive direction of the conveyor, and a second setting, which corresponds to the reverse drive direction of the conveyor. The identification means are arranged to identify the forthcoming drive direction of the conveyor based on the setting of the direction switch.

In one embodiment of the method a change in the drive status is identified during the operation of the conveyor, and the tightening force of the traction element is adjusted on the basis of the change in drive status.

In one embodiment of the method the setting of the forthcoming drive direction is identified in order to identify the drive status, based on which the tightening force is adjusted to the force level corresponding to the aforementioned drive direction before the starting of the conveyor in the drive direction defined by the setting.

In one embodiment of the method the load of the conveyor is determined in order to identify the drive status.

In one embodiment of the method a change in the load of the conveyor is determined in order to identify the drive status.

In one embodiment of the method the tightening force is adjusted to at least two different force levels according to the drive status.

In one embodiment of the method the tightening force is adjusted steplessly to different force levels according to the drive status.

In one embodiment of the method the tightening force of the traction element in the reverse drive direction is adjusted to a force level, which is greater than the force level used in the forward direction drive.

The identification means of the drive status and/or identification of the drive status can be wholly or partially a structural or functional part of the drive of the travelator and/or its control system. For example the drive direction of the conveyor of the travelator can be set with a manual switch or can e.g. be based on an observation appliance, which monitors the movement of people near the travelator or the ends of the travelator. The control deriving from setting the drive direction itself or the control based on it can be used to adjust or set the tightening force.

The attributes of different embodiments and applications of the invention can be used in conjunction with each other within the scope of the inventive concept or its objectives or the problem it solves and the inventive content can also be defined differently than in the claims presented below.

LIST OF FIGURES

Figure 3:
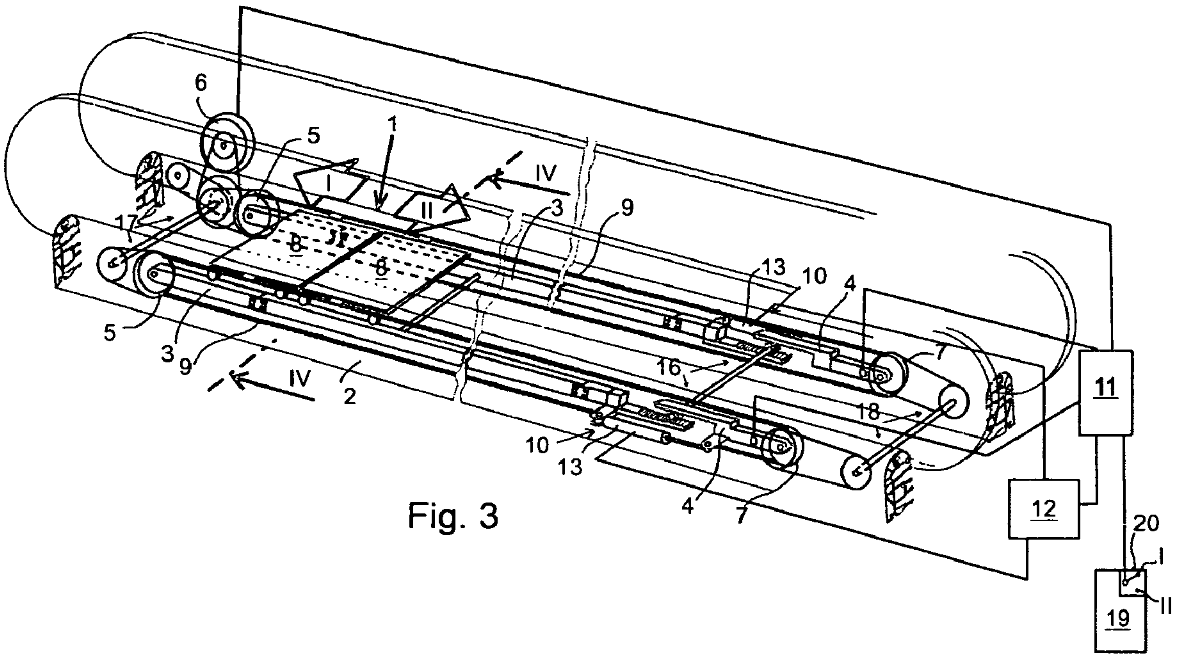
Figure 4:
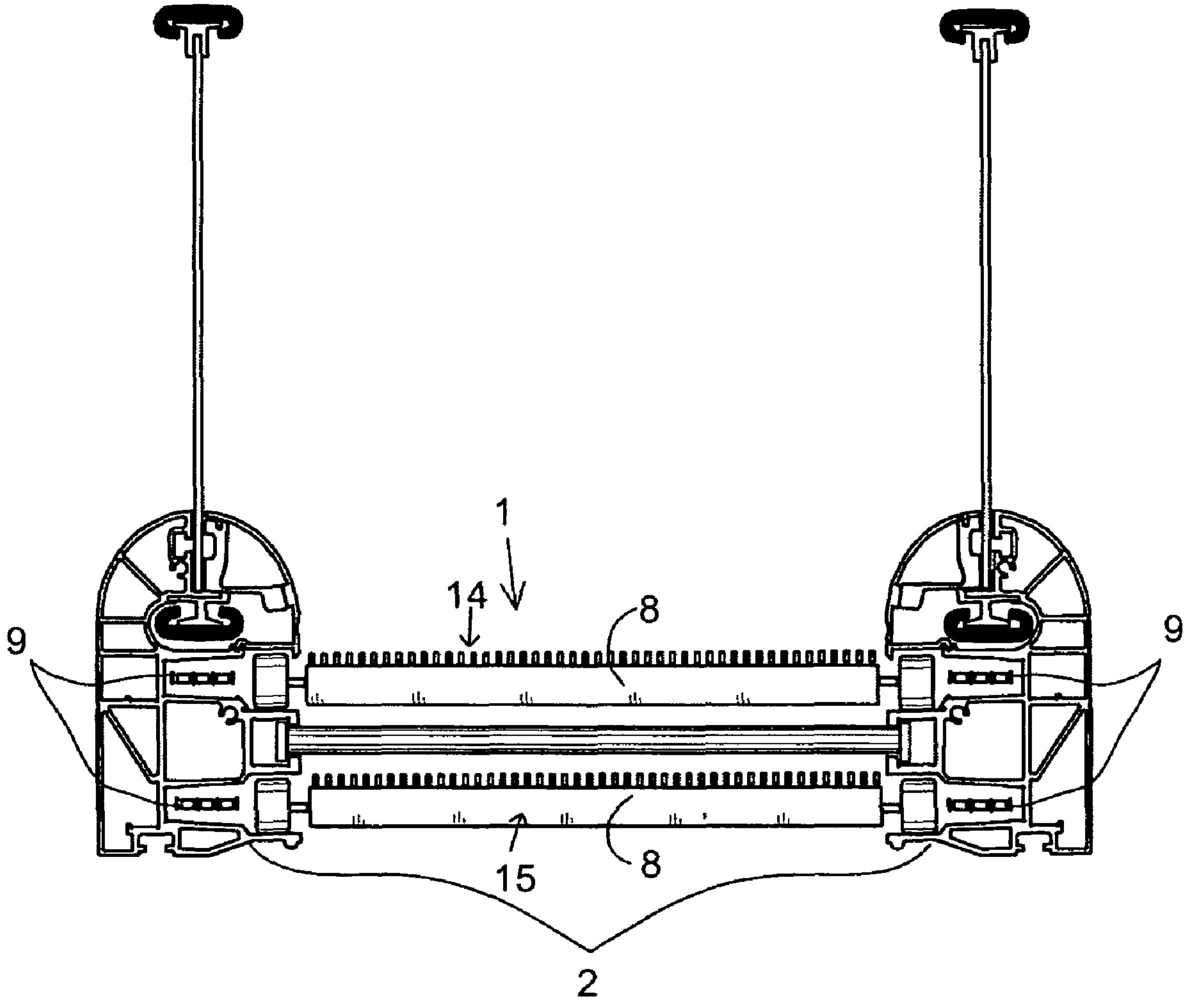

In the following, the invention will be described in detail by the aid of a few examples of its embodiments with reference to the attached drawings, wherein FIG. 1 presents a diagrammatic side view of the travelator and its force situation when it is being driven in the forward drive direction, FIG. 2 presents the travelator of FIG. 1 and its force situation when it is being driven in the reverse drive direction, FIG. 3 presents axonometrically a diagram of one embodiment of the travelator according to the invention, and FIG. 4 presents an IV-IV section of FIG. 3.

DETAILED DESCRIPTION OF THE INVENTION

FIGS. 3 and 4 show a travelator, which is of low construction, installed on a fixed base, such as on the floor or other support, which means that a recess for the machineries of the travelator does not need to be made in the fixed base, such as the floor. In the following description of the embodiment the invention is described in connection with a horizontal travelator, but it is obvious that the corresponding principles of the invention can also be applied to inclined moving ramps.

The travelator comprises a conveyor 1, which can be e.g. a pallet conveyor, in which is a plurality of consecutive transport surfaces 8, of which only two are presented diagrammatically in FIG. 3 for the sake of clarity.

The conveyor 1 comprises a frame formed of two halves, both of which are referred to in this description simply as the frame 2. The frame 2 comprises a first frame half 3, which is essentially fixed in its stationary position, and a second frame half 4, which is controlled to move in relation to the first frame half 3. A drive wheel 5 is mounted onto the first frame half 3 on a bearing allowing rotation. A power unit 6, e.g. an electric motor such as preferably a permanent magnet synchronous motor, rotates the drive wheel 5 via transmission means. A diverting wheel 7 is mounted onto the second frame half 4 on a bearing allowing free rotation. A traction element 9 formed of two endless loops, to which the transport surfaces 8 are connected on their opposite sides, is led to pass over the drive wheels 5 and the diverting wheels 7. The traction elements 9 are sprocket chains and correspondingly the diverting wheels and drive wheels are sprocket wheels. In some other embodiment the sprocket chains can be belts, such as cogged belts, and the drive wheels and diverting wheels can be belt pulleys, such as cogged belt pulleys.

Each traction element 9 has a tightening device 10, which is arranged to act between the first frame part 3 and the second frame part 4 to move the diverting wheel 7 linearly away from the drive wheel 5 so that tightening force is exerted on the traction element 9.

The travelator further comprises identification means 11 for identifying the drive status of the conveyor 1 and changes in it. The adjustment means 12 adjust the tightening force of the tightening device 10 to different force levels on the basis of the drive status identified by the identification means.

The identification means 11 function such that they can identify the drive status of the conveyor in advance before the conveyor has started, because especially the drive direction of conveyor must be known before starting so that the tightening force can be adjusted to be suitable in relation to the drive direction. On the other hand during the operation of the travelator the identification means 11 identify the drive status of the conveyor and changes in it continuously or periodically. The load exerted on the conveyor 1 varies according to how many passengers travel on the travelator. The tightening force of the traction element 9 of the conveyor is therefore fine-tuned on the basis of the load.

The drive direction of the conveyor 1 can be changed such that it can be driven in the forward drive direction I and in the reverse drive direction II. The identification means 11 identify the drive status, which is the setting for the forthcoming drive direction before the starting of the conveyor in the drive direction defined by the setting. The conveyor includes a control device 19, which comprises a direction switch 20 or similar, which has a first setting I, which corresponds to the forward drive direction I of the conveyor, and a second setting II, which corresponds to the reverse drive direction II of the conveyor. The identification means 11 identify the forthcoming drive direction of the conveyor before the starting of the conveyor based on the setting of the direction switch 20. Thus the tightening force of the traction elements 9 is adjusted to the correct level before the starting of the conveyor 1.

The identification means comprise means for determining the torque of the motor 6 in order to identify the load. The load can also be measured, as the identification means comprise means for determining the stresses of the frame 2 of the conveyor, and the load can be calculated on the basis of the stresses.

The tightening devices 10 comprise two hydraulic cylinders 13, both of which are connected at one end to the first frame half 3 and at the other end to the second frame half 4. The adjustment means comprise a control device 12, which is fitted to control the hydraulic pressure of the hydraulic cylinder 13 for selecting different levels of tightening force. Instead of the hydraulic cylinders 13 it is possible to use any other suitable force element whatsoever with which the different force levels for the traction element are achieved.

The tightening force of the tightening device 10 can be adjusted to at least two different force levels e.g. depending on the drive direction. It is also possible to arrange such that the tightening force of the tightening device 10 can be adjusted steplessly to different force levels based on the different loads.

As is best seen in FIG. 4, the traction element 9 comprises an upper section 14, in which the transport surfaces 8 connected to the traction element 9 travel from one end to the other end of the conveyor 1 in order to transport passengers. On the lower section 15, the transport surfaces 8 return back. In the forward drive direction I the direction of travel of the upper section is from the diverting wheel 7 towards the drive wheel 5, and in the reverse drive direction II the direction of travel of the upper section is from the drive wheel 5 to the diverting wheel 7. In the reverse drive direction II the tightening force of the tightening device 10 can be adjusted to a force level which is essentially greater than in the forward drive direction I. For example, the tightening force needed in the reverse drive direction II can be in the range of ten times in relation to the tightening force needed in the forward drive direction I. The difference between the levels of tightening force caused by changing the drive direction is relatively high compared to the fine-adjustment during operation, which is caused by changes in the load.

The mechanical transmission elements 16, the structure of which is not described in more detail in this context, but the principle of which is shown in FIG. 3, are arranged to act between the tightening devices 10 in order to keep the stroke lengths of their tightening movements of equal magnitude. FIG. 3 further shows the first synchronization means 17, for synchronizing the drive wheels 5 with each other. Correspondingly the second synchronization means 18 synchronize the diverting wheels 7 with each other.

The invention is not limited solely to the embodiments described above, but instead many variations are possible within the scope of the inventive concept defined by the claims below.

The invention claimed is:

1. Travelator, employing a conveyor system, the travelator comprising:

a frame, including a first frame half, the first frame half being essentially fixed in its position, and a second frame half, with the second frame half being controlled to move in relation to the first frame half;

a drive wheel, attached to the first frame half, and mounted on a bearing allowing rotation of the drive wheel;

a power unit to generate power to cause the drive wheel to rotate rotating the drive wheel;

a diverting wheel, attached to the second frame half, and mounted on a bearing allowing free rotation of the diverting wheel;

transport surfaces, wherein the transport surfaces carry passengers;

at least one traction element formed as an endless loop, attached to the transport surfaces arranged in consecutive order, supporting passenger conveyance and with the at least one traction element is led to pass over the drive wheel and the diverting wheel;

a tightening device, arranged to act between the first frame half and the second frame half to move the diverting wheel linearly away from the drive wheel to exert tightening force on the traction element;

an identification means configured to identify a drive status of the travelator, wherein the drive status includes a drive direction of said at least one traction element; and an adjustment means arranged to adjust the tightening force of the tightening device to different force levels based on the drive status identified, wherein said at least one traction element includes an upper section, with the transport surfaces connected to the traction element travel from the first end to the second end of the conveyor to convey passengers; and a lower section, with the transport surfaces returning from the second end back to the first end;

wherein the upper section travels from the diverting wheel towards the drive wheel when the traction element moves in a forward drive direction; and wherein the upper transport section travels from the drive wheel to the diverting wheel when the traction element moves in a reverse drive direction; and wherein the adjustment means adjusts the tightening force of the tightening device to a force level greater than a force level associated with the forward drive direction when the traction element moves in the reverse drive direction.

2. Travelator according to claim 1, wherein the identification means is arranged to identify a change in drive status during operation of the conveyor system, and the adjustment means is arranged to adjust the tightening force of the tightening device to different force levels based on the identified change of drive status.

3. Travelator according to claim 1, wherein the identification means is arranged to identify the drive status of the conveyor before the conveyor starts moving when a desired drive direction of the conveyor is changed.

4. Travelator according to claim 1, wherein the drive status is the load exerted on the conveyor.

5. Travelator according to claim 4, wherein the identification means is further arranged to identify a change in the load exerted on the conveyor.

6. Travelator according to claim 4, wherein the power unit is a motor; and the identification means identifies the load by determining the torque of the motor.

7. Travelator according to claim 4, wherein the identification means identifies the load by determining the stresses of the frame of the conveyor.

8. Travelator according to claim 1, wherein the tightening device includes at least one hydraulic cylinder, which is connected at one end to the first frame half and at the other end to the second frame half, and wherein the adjustment means includes a control device that selects different levels of tightening force by controlling the hydraulic pressure of said at least one cylinder.

9. Travelator according to claim 1, wherein the adjustment means is configured to adjust the tightening force of the tightening device between at least two different force levels.

10. Travelator according to claim 1, wherein the tightening force of the tightening device is steplessly adjusted to different force levels.

11. Travelator according to claim 1, wherein the conveyor system further comprises a control device that includes a direction selector which has a first setting corresponding to the forward drive direction, and a second setting corresponding to the reverse drive direction; and wherein the identification means is arranged to identify a forthcoming drive direction of the conveyor based on the setting of the direction switch.

12. Method for controlling the operation of a travelator, comprising:

identifying the drive status of a conveyor;

applying tightening force to an endless traction element of the conveyor based on the drive status identified, wherein the traction element supports passenger conveyance;

adjusting the tightening force such that a tightening force level applied for a reverse drive direction is greater than the force level used in a forward drive direction, wherein said adjusting is accomplished with a tightening device which moves a diverting wheel linearly away from the a drive wheel of the conveyor in order to exert tightening force on the endless traction element of the conveyor; and identifying the setting of a future change in the drive direction of the conveyor relating to the drive status, wherein said adjusting the tightening force includes adjusting the tightening force to the force level corresponding to the future change in the drive direction before the starting of the conveyor in the drive direction defined by the setting.

13. Method according to claim 12, further comprising identifying a change in the drive status during the operation of the conveyor, and wherein said adjusting the tightening force includes adjusting the tightening force on the basis of the change in the drive status.

14. Method for controlling the operation of a travelator, comprising:

identifying the drive status of a conveyor;

applying tightening force to an endless traction element of the conveyor based on the drive status identified, wherein the traction element supports passenger conveyance; and adjusting the tightening force such that a tightening force level applied for a reverse drive direction is greater than the force level used in a forward drive direction, wherein said adjusting is accomplished with a tightening device which moves a diverting wheel linearly away from the a drive wheel of the conveyor in order to exert tightening force on the endless traction element of the conveyor, wherein said adjusting the tightening force includes selecting a force level from at least two different force levels according to the drive status.

15. Method according to claim 14, wherein said identifying the drive status includes determining a load of the conveyor.

16. Method for controlling the operation of a travelator, comprising:

identifying the drive status of a conveyor;

applying tightening force to an endless traction element of the conveyor based on the drive status identified, wherein the traction element supports passenger conveyance; and adjusting the tightening force such that a tightening force level applied for a reverse drive direction is greater than the force level used in a forward drive direction, wherein said adjusting is accomplished with a tightening device which moves a diverting wheel linearly away from the a drive wheel of the conveyor in order to exert tightening force on the endless traction element of the conveyor, wherein said adjusting the tightening force includes steplessly adjusting the tightening force to different force levels according to the drive status.

17. Method according to claim 16, wherein said identifying the drive status includes determining a change in a load of the conveyor.

* * * * *